(12) United States Patent
Batra

(10) Patent No.: US 7,800,500 B2
(45) Date of Patent: *Sep. 21, 2010

(54) RF SYSTEMS AND METHODS FOR TRACKING AND SINGULATING TAGGED ITEMS

(75) Inventor: Naresh Batra, Saratoga, CA (US)

(73) Assignee: Intelleflex Corporation, San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/042,818

(22) Filed: Mar. 5, 2008

(65) Prior Publication Data

US 2008/0150695 A1  Jun. 26, 2008

Related U.S. Application Data

(63) Continuation of application No. 11/423,410, filed on Jun. 9, 2006, now Pat. No. 7,525,434.

(51) Int. Cl.
G08B 13/14 (2006.01)

(52) U.S. Cl. .................. 340/572.1; 700/45; 700/225

(58) Field of Classification Search ... 340/527.1–572.9; 235/375–385; 700/45, 225
See application file for complete search history.

(56) References Cited

U.S. PATENT DOCUMENTS

| | | | |
|---|---|---|---|
| 6,354,493 B1 * | 3/2002 | Mon | 235/380 |
| 6,552,261 B2 * | 4/2003 | Shlahtichman et al. | 174/384 |
| 6,552,661 B1 * | 4/2003 | Lastinger et al. | 340/572.1 |
| 6,600,418 B2 | 7/2003 | Francis et al. | 340/572.1 |
| 7,030,761 B2 * | 4/2006 | Bridgelall et al. | 340/572.2 |
| 7,525,434 B2 * | 4/2009 | Batra | 340/572.1 |
| 2005/0198228 A1 | 9/2005 | Bajwa et al. | 709/220 |
| 2006/0055552 A1 | 3/2006 | Chung et al. | 340/686.1 |
| 2006/0214773 A1 * | 9/2006 | Wagner et al. | 340/10.2 |
| 2006/0284727 A1 * | 12/2006 | Steinke | 340/10.31 |
| 2007/0257776 A1 * | 11/2007 | Kim et al. | 340/10.2 |
| 2008/0001725 A1 * | 1/2008 | White et al. | 340/10.51 |

OTHER PUBLICATIONS

Search Report and Written Opinion from PCT Application No. PCT/US07/13239 mailed Jan. 18, 2008.

* cited by examiner

*Primary Examiner*—Davetta W Goins
*Assistant Examiner*—Edny Labbees
(74) *Attorney, Agent, or Firm*—Zilka-Kotab, PC

(57) ABSTRACT

A method in one embodiment comprises scanning a zone in an active mode at a first power level for identifying presence of a tag; and scanning portions of the zone in a passive mode at a second power level for again identifying presence of the tag. A system in another embodiment comprises an interrogator for scanning a zone in an active mode at a first power level for identifying presence of a tag; wherein the interrogator also scans portions of the zone for again identifying presence of the tag. A method in another embodiment comprises scanning zones of an area in an active mode for identifying the zone in which the tag is located; and scanning portions of the zone in which the tag is located in a passive mode for identifying the portion of the zone in which the tag is located.

20 Claims, 5 Drawing Sheets

RF SYSTEMS AND METHODS FOR TRACKING AND SINGULATING TAGGED ITEMS

RELATED APPLICATIONS

This application is a continuation of U.S. patent application Ser. No. 11/423,410 filed Jun. 9, 2006, now U.S. Pat. No. 7,525,434 which is herein incorporated by reference.

FIELD OF THE INVENTION

The present invention relates to Radio Frequency (RF) systems and methods, and more particularly, this invention relates to systems and methods for tracking and singulating tagged items.

BACKGROUND OF THE INVENTION

Automatic identification ("Auto-ID") technology is used to help machines identify objects and capture data automatically. One of the earliest Auto-ID technologies was the bar code, which uses an alternating series of thin and wide bands that can be digitally interpreted by an optical scanner. This technology gained widespread adoption and near-universal acceptance with the designation of the Universal Product Code ("UPC")—a standard governed by an industry-wide consortium called the Uniform Code Council. Formally adopted in 1973, the UPC is one of the most ubiquitous symbols present on virtually all manufactured goods today and has allowed for enormous efficiency in the tracking of goods through the manufacturing, supply, and distribution of various goods.

However, the bar code still requires manual interrogation by a human operator to scan each tagged object individually with a scanner. This is a line-of-sight process that has inherent limitations in speed and reliability. In addition, the UPC bar codes only allow for manufacturer and product type information to be encoded into the barcode, not the unique item's serial number. The bar code on one milk carton is the same as every other, making it impossible to count objects or individually check expiration dates, much less find one particular carton of many.

Currently, retail items are marked with barcode labels. These printed labels have over 40 "standard" layouts, can be mis-printed, smeared, mis-positioned and mis-labeled. In transit, these outer labels are often damaged or lost. Upon receipt, the pallets typically have to be broken-down and each case scanned into an enterprise system. Error rates at each point in the supply chain have been 4-18% thus creating a billion dollar inventory visibility problem. However, Radio Frequency Identification (RFID) allows the physical layer of actual goods to automatically be tied into software applications, to provide accurate tracking.

The emerging RFID technology employs a Radio Frequency (RF) wireless link and ultra-small embedded computer chips, to overcome these barcode limitations. RFID technology allows physical objects to be identified and tracked via these wireless "tags". It functions like a bar code that communicates to the reader automatically without needing manual line-of-sight scanning or singulation of the objects.

Current methods of tracking RFID tagged objects rely on triangulation of a tag's signal using multiple readers. However, triangulation typically provides only a general vicinity of the tagged item. If the user wants to physically retrieve the tagged item, the user must still manually search for the tagged item in that general area. This can be a very time consuming process in a large venue with potentially hundreds or thousands of tagged items within a few feet of each other.

Further, because RF energy is reflected by other objects in the environment, environmental reflections of the tag's signal can skew the triangulation result, causing the system to indicate the wrong general location of the tag.

A further drawback of triangulation is that all tags are activated and singulated until the desired tag is found. In a warehouse for example, where there may be tens of thousands of tags, the singulation process may take a long time; meanwhile precious battery power is being consumed on those tags waiting to be singulated and respond.

What are therefore needed are new and more efficient methods and systems to track and singulate homogeneous and/or nonhomogeneous tagged items.

SUMMARY OF THE INVENTION

A method according to one embodiment comprises scanning a zone in an active mode at a first power level for identifying presence of a tag; and scanning portions of the zone in a passive mode at a second power level, for again identifying presence of the tag A system according to another embodiment comprises an interrogator for scanning a zone in an active mode at a first power level for identifying presence of a tag; wherein the interrogator also scans portions of the zone for again identifying presence of the tag.

A method according to yet another embodiment comprises scanning zones of an area in an active mode for identifying the zone in which the tag is located; and scanning portions of the zone in which the tag is located in a passive mode for identifying the portion of the zone in which the tag is located.

An RFID system includes a plurality of RFID tags and an RFID interrogator in communication with the RFID tags. Each tag may be coupled to an object, each tag storing information about the object to which coupled. Likewise, each tag may have a unique identifier, the identifier being correlated with information about the object in a database.

Other aspects, embodiments, and advantages of the present invention will become apparent from the following detailed description, which, when taken in conjunction with the drawings, illustrate by way of example the principles of the invention.

BRIEF DESCRIPTION OF THE DRAWINGS

For a fuller understanding of the nature and advantages of the present invention, as well as the preferred mode of use, reference should be made to the following detailed description read in conjunction with the accompanying drawings.

BEST MODE FOR CARRYING OUT THE INVENTION

The following description is the best mode presently contemplated for clearing out the present invention. This description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, ail terms are to be given their broadest possible interpretation including meanings implied from the specification as well as meanings understood by those skilled in the art and as defined in dictionaries, treatises, etc.

The following specification describes RF systems and methods for tracking and singulating tagged objects. Preferred embodiments implement RFID technology.

The use of RFID tags are quickly gaining popularity for use in the monitoring and tracking of an item. RFID technology allows a user to remotely store and retrieve data in connection with an item utilizing a small, unobtrusive tag. As an RFID tag operates in the radio frequency (RF) portion of the electromagnetic spectrum, an electromagnetic or electrostatic coupling can occur between an RFID tag affixed to an item and an RFID tag reader. This coupling is advantageous, as it precludes the need for a direct contact or line of sight connection between the tag and the reader.

Utilizing an RFID tag, an item may be tagged at a period when the initial properties of the item are known. For example, this first tagging of the item may correspond with the beginning of the manufacturing process, or may occur as an item is first packaged for delivery. Electronically tagging the item allows for subsequent electronic exchanges of information between the tagged item and a user, wherein a user may read information stored within the tag and may additionally write information to the tag.

Figure 1:
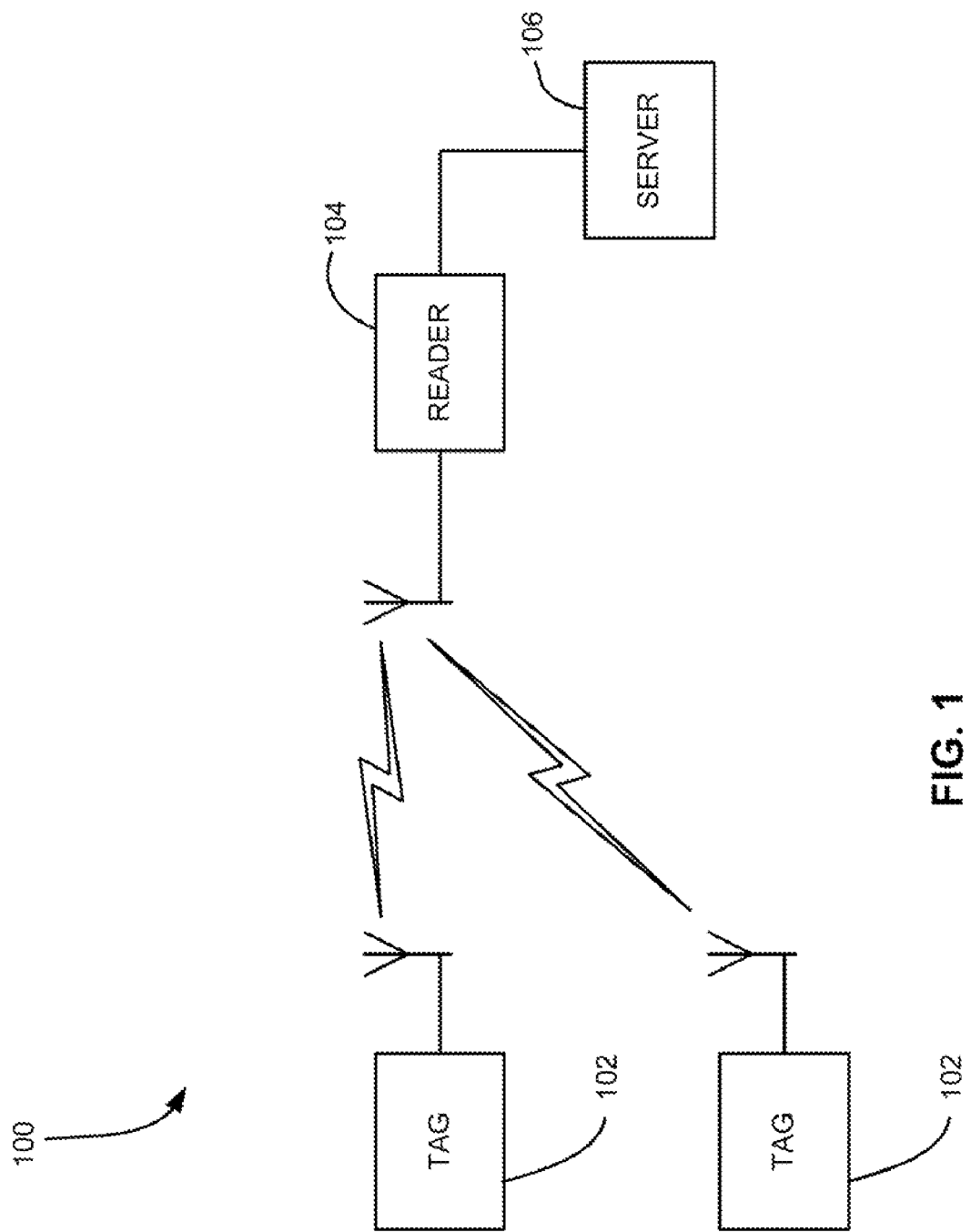
FIG. 1 is a system diagram of an RFID system.

As shown in FIG. 1, an RFID system 100 includes RFID tags 102, an interrogator or "reader" 104, and an optional server 106 or other backend system. Each tag 102 may be coupled to an object. Each tag 102 includes a chip and an antenna. The chip includes a digital decoder needed to execute the computer commands that the tag 102 receives from the interrogator 104. The chip may also include a power supply circuit to extract and regulate power from the RF interrogator; a detector to decode signals from the interrogator; a backscatter modulator, a transmitter to send data back to the interrogator; anti-collision protocol circuits; and at least enough memory to store its unique identification code, e.g., Electronic Product Code (EPC) code.

The EPC is a simple, compact identifier that uniquely identifies objects (items, cases, pallets, locations, etc.) in the supply chain. The EPC is built around a basic hierarchical idea that can be used to express a wide variety of different, existing numbering systems, like the EAN.UCC System Keys, UID, VIN, and other numbering systems. Like many current numbering schemes used in commerce, the EPC is divided into numbers that identify the manufacturer and product type. In addition, the EPC uses an extra set of digits, a serial number, to identify unique items. A typical EPC number contains:

1. Header, which identifies the length, type, structure, version and generation of EPC;
2. Manager Number, which identifies the company or company entity;
3. Object Class, similar to a stock keeping unit or SKU; and
4. Serial Number, which is the specific instance of the Object Class being tagged.

Additional fields may also be used as part of the EPC in order to properly encode and decode information from different numbering systems into their native (human-readable) forms.

Each tag 102 may also store information about the item to which coupled, including but not limited to a name or type of item, serial number of the item, date of manufacture, place of manufacture, owner identification, origin and/or destination information, expiration date, composition, information relating to or assigned by governmental agencies and regulations, etc.

Communication begins with a interrogator 104 sending out signals via radio wave to find a tag 102. When the radio wave hits the tag 102 and the tag 102 recognizes and responds to the interrogator's signal, the interrogator 104 decodes the data programmed into the tag 102. The information is then passed to a sewer 106 for processing, storage, and/or propagation to another computing device. By tagging a variety of items, information about the nature and location of goods can be known instantly and automatically.

Many RFID systems use reflected or "backscattered" radio frequency (RF) waves to transmit information from the tag 102 to the interrogator 104. Since passive (Class-1 and Class-2) tags get all of their power from the interrogator signal, the tags are only powered when in the beam of the interrogator 104.

The Auto ID Center EPC-Compliant tag classes are set forth below:

Class-1
Passive identity tags (RF user programmable, range ~3 m)
Lowest cost
Class-2
Passive memory tags (20 bit address space programmable at ~3 m range)
Security & privacy protection
Low cost
Class-3
Semi-passive tags (also called semi-active tags)
Battery tags (256 bits to 2M words)
Self-Powered Backscatter (internal, clock, sensor interface support)
~100 meter range
Moderate cost
Class-4
Active tags
Active transmission (permits tag-speaks-first operating modes)
~30,000 meter range
Higher cost In RFID systems where passive receivers (i.e., Class-1 and Class-2 tags) are able to capture enough energy from the transmitted RF to power the device, no batteries are necessary. In systems where distance prevents powering a device in this manner, an alternative power source must be used. For these "alternate" systems (also known as semi-active or semi-passive), batteries are the most common form of power. This greatly increases read range, and the reliability of tag reads, because the tag does not need power from the interrogator to respond. Class-3 tags only need a 5 mV signal from the interrogator in comparison to the 500 mV that Class-1 and Class-2 tags typically need to operate. This 100:1 reduction in power requirement along with the reader's ability to sense a very small backscattered signal enables the tag permits Class-3 tags to operate out to a free space distance of 100 meters or more compared with a Class-1 range of only about 3 meters. Note that semi-passive and active tags may also operate in passive mode, using only energy captured from an incoming RF signal to operate and respond.

Active, semi-active and passive RFID tags may operate within various regions of the radio frequency spectrum. Low-frequency (30 KHz to 500 KHz) tags have low system costs and are limited to short reading ranges. Low frequency tags may be used in security access and animal identification applications for example. High-frequency (860 MHz to 960 MHz and 2.4 GHz to 2.5 GHz) tags offer increased read, ranges and high reading speeds. One illustrative application of high frequency tags is automated toll collection on highways and interstates.

Figure 2:
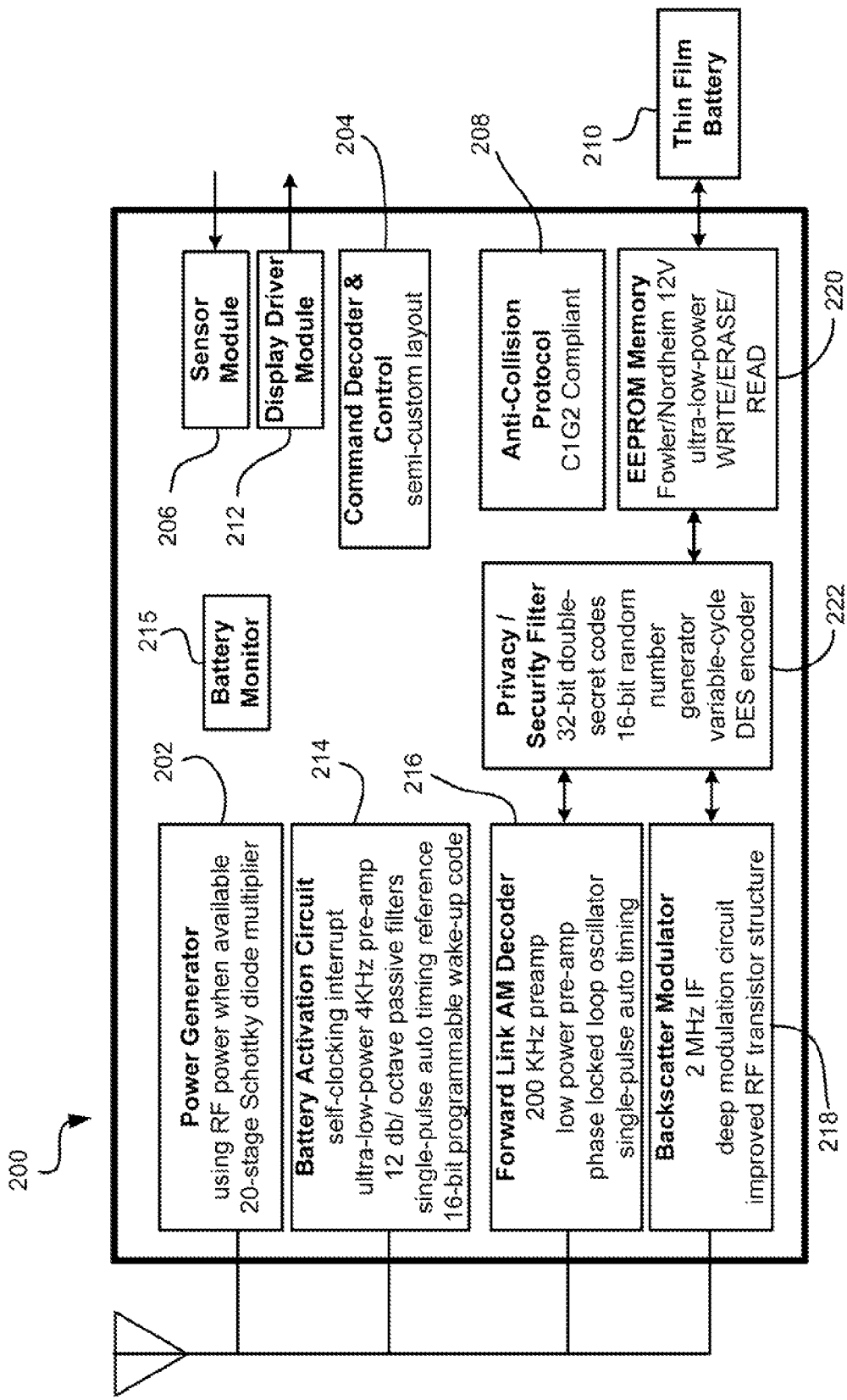
FIG. 2 is a system diagram for an integrated circuit (IC) chip for implementation in an RFID tag.

Embodiments of the present invention are preferably implemented in a Class-3 or higher Class chip. FIG. 2 depicts a circuit layout of a Class-3 chip 200 according to an illustrative embodiment for implementation in an RFID tag. This Class-3 chip can form the core of RFID chips appropriate for many applications such as identification of pallets, cartons, containers, vehicles, or anything where a range of more than 2-3 meters is desired. As shown, the chip 200 includes several industry-standard circuits including a power generation and regulation circuit 202, a digital command decoder and control circuit 204, a sensor interface module 206, a C1G2 interface protocol circuit 208, and a power source (battery) 210, A display driver module 212 can be added to drive a display.

A battery activation circuit 214 is also present to act as a wake-up trigger. In brief, many portions of the chip 200 remain in hibernate state during periods of inactivity. A hibernate state may mean a low power state, or a no power state. The battery activation circuit 214 remains active and processes incoming signals to determine whether any of the signals contain an activate command. If one signal does contain a valid activate command, additional portions of the chip 200 are wakened from the hibernate state, and communication with the interrogator can commence. In one embodiment, the battery activation circuit 214 includes an ultra-low-power, narrow-bandwidth preamplifier with an ultra low power static current drain. The battery activation circuit 214 also includes a self-clocking interrupt circuit and uses an innovative user-programmable digital wake-up code. The battery activation circuit 214 draws less power during its sleeping state and is much better protected against both accidental and malicious false wake-up trigger events that otherwise would lead to pre-mature exhaustion of the Class-3 tag battery 210. While any type of battery activation circuit known in the art can be potentially integrated into the system, an illustrative battery activation circuit 214 is described in copending U.S. patent application No. 11/007,973 filed Dec. 8, 2004 with title "BATTERY ACTIVATION CIRCUIT", which is herein incorporated by reference.

A battery monitor 215 can be provided to monitor power usage in the device. The information collected can then be used to estimate a useful remaining life of the battery.

A forward link AM decoder 216 uses a simplified phase-lock-loop oscillator that requires an absolute minimum amount of chip area. Preferably, the circuit 216 requires only a minimum string of reference pulses.

A backscatter modulator block 218 preferably increases the backscatter modulation depth to more than 50%.

A memory cell, e.g., EEPROM, is also present. In one embodiment, a pure, Fowler-Nordheim direct-tunneling-through-oxide mechanism 220 is present to reduce both the WRITE and ERASE currents to about 2 µA/cell in the EEPROM memory array. Unlike any RFID tags built to date, this will permit designing of tags to operate at maximum range even when WRITE and ERASE operations are being performed. In other embodiments, the WRITE and ERASE currents may be higher or lower, depending on the type of memory used and its requirements.

The module 200 may also incorporate a highly-simplified, yet very effective, security encryption circuit 222. Other security schemes, secret handshakes with interrogators, etc. can be used.

Only four connection pads (not shown) are required for the chip 200 to function: Vdd to the battery, ground, plus two antenna leads to support multi-element omni-directional and isotropic antennas. Sensors to monitor temperature, shock, tampering, etc. can be added by appending an industry-standard I$^2$C or SPI interface to the core chip.

It should be kept in mind that the present invention can be implemented using any type of tag, and the circuit 200 described above is presented as only one possible implementation.

Many types of devices can take advantage of the embodiments disclosed herein, including but not limited to Radio Frequency Identification RFID systems and other wireless devices/systems. To provide a context, and to aid in understanding the embodiments of the invention, much of the present description shall be presented in terms of an RFID system such as that shown in FIG. 1. It should be kept in mind that this is done by way of example only, and the invention is not to be limited to RFID systems, as one skilled in the art will appreciate how to implement the teachings herein into electronics devices in hardware and/or software. In other words, the invention can be implemented entirely in hardware, entirely in software, or a combination of the two. Examples of hardware include Application Specific Integrated Circuits (ASICs), printed circuits, monolithic circuits, reconfigurable hardware such as Field Programmable Gate Arrays (FPGAs), etc. The invention can also be provided in the form of a computer program product comprising a computer readable medium having computer code thereon. A computer readable medium can include any medium capable of storing computer code thereon for use by a computer, including optical media such as read only and writeable CD and DVD, magnetic memory, semiconductor memory (e.g., FLASH memory and other portable memory cards, etc.), etc. Further, such software can be downloadable or otherwise transferable from one computing device to another via network, wireless link, non-volatile memory device, etc.

A computer for storing and/or executing the code and/or performing the processes described herein can be any type of computing device, including a personal computer (PC), laptop PC, handheld device (e.g., personal digital assistant (PDA)), portable telephone, etc.

As mentioned above, RFID tags may be coupled to objects, each tag being associated with and optionally storing information about the object to which coupled. A tagged object can be identified and located by identifying and locating the tag coupled to it.

Figure 3:
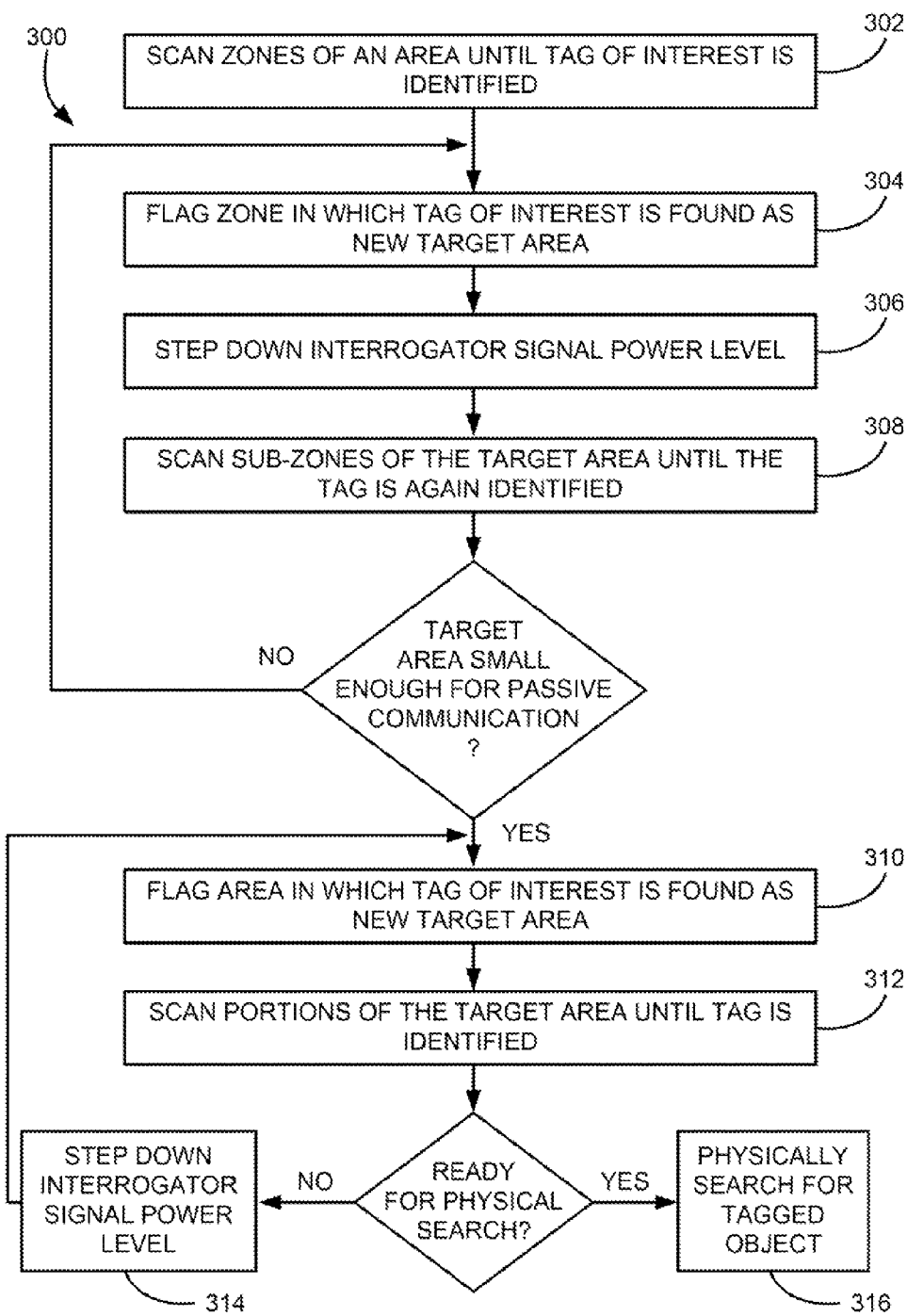
FIG. 3 is a flow diagram of a process for identifying an approximate location of an object tagged with a powered (semi-passive or active) tag across a large area according to one embodiment.

FIG. 3 illustrates a process for identifying an approximate location of an object tagged with a powered (semi-passive or active) tag across a large area, e.g., greater than 9 square meters, according to one embodiment of the present invention. In operation 302, particular zones of the area are scanned in active mode until the tag of interest is identified. The scanning operation may include activation and singulation of the tags to retrieve the unique ID of each tag. Each ID can then be compared to some predefined criteria, such as an ID of the target tag. In another example, if searching by serial number of the target tagged item, the tag ID can be correlated to a serial number in a database to determine whether the item is the target item. If the tag ID matches or is correlated to the predefined criteria, the tag is identified as the tag of interest. In operation 304, the zone in which the tag of interest is found is flagged as the new target area. In operation 306, interrogator power (and thus its effective range) is stepped down, and smaller portions or sub-zones of the new target area are scanned in operation 308 until the target tag is located. Operations 304-308 are repeated (if necessary) on smaller and smaller portions of the previously identified zone until the target area is small enough for passive communication, i.e., the tag is able to operate in passive mode, e.g., the tag receives enough incoming RF energy to function without battery power and/or the tag does not need to use battery to enhance backscatter. In operation 310, the zone in which the tag of interest is found is flagged as the new target area. In operation 312, smaller zones within the new target zone are scanned in passive mode until the area containing the target tag is located. An illustrative passive mode follows the C1G2 standard. If the area is small enough, the tagged object is physically searched for in operation 316. If not, the interrogator power is stepped down in operation 314. Operations 310-314 may be repeated (if necessary) until the tag is within a close proximity, such as within about 0.1 to about 3 meters. The item to which the tag is attached should thus be easily findable by physical (vs. electronic) search.

In a preferred embodiment, a single interrogator is used at least during operations 302-308, the single interrogator being moved from zone to zone for each scanning operation. The same interrogator, or a different interrogator, may be used during operations 310-314.

How the tag is identified depends on the particular circumstances of the search. For instance, assume that a user wants to find an object having a serial number of 123456. If the serial number can be correlated with the tag ID via a database, then identifying the tag as the target tag is simply a matter of querying the tag for its ID. If the tag ID is not known, then each tag can be queried to return the serial number of the object it is coupled to. The serial numbers returned by the tag are compared to the desired serial number (123456) until a match is found. A similar procedure can be followed for any parameter or set of parameters. An example of the latter is a search for an object manufactured on Jan. 13, 2006 at the San Jose, Calif. plant.

The tag may include a visual or audible indicator to assist the user in physically locating the tag. For instance, upon sending an appropriate instruction to the tag, an illuminated or flashing LED and/or chime on the tag may provide an indication of the location of the tag. Because the interrogator is close enough to the tag to allow the tag to operate in passive mode, the visible and/or audible indicator should be perceivable by a user in the immediate vicinity.

Figure 4:
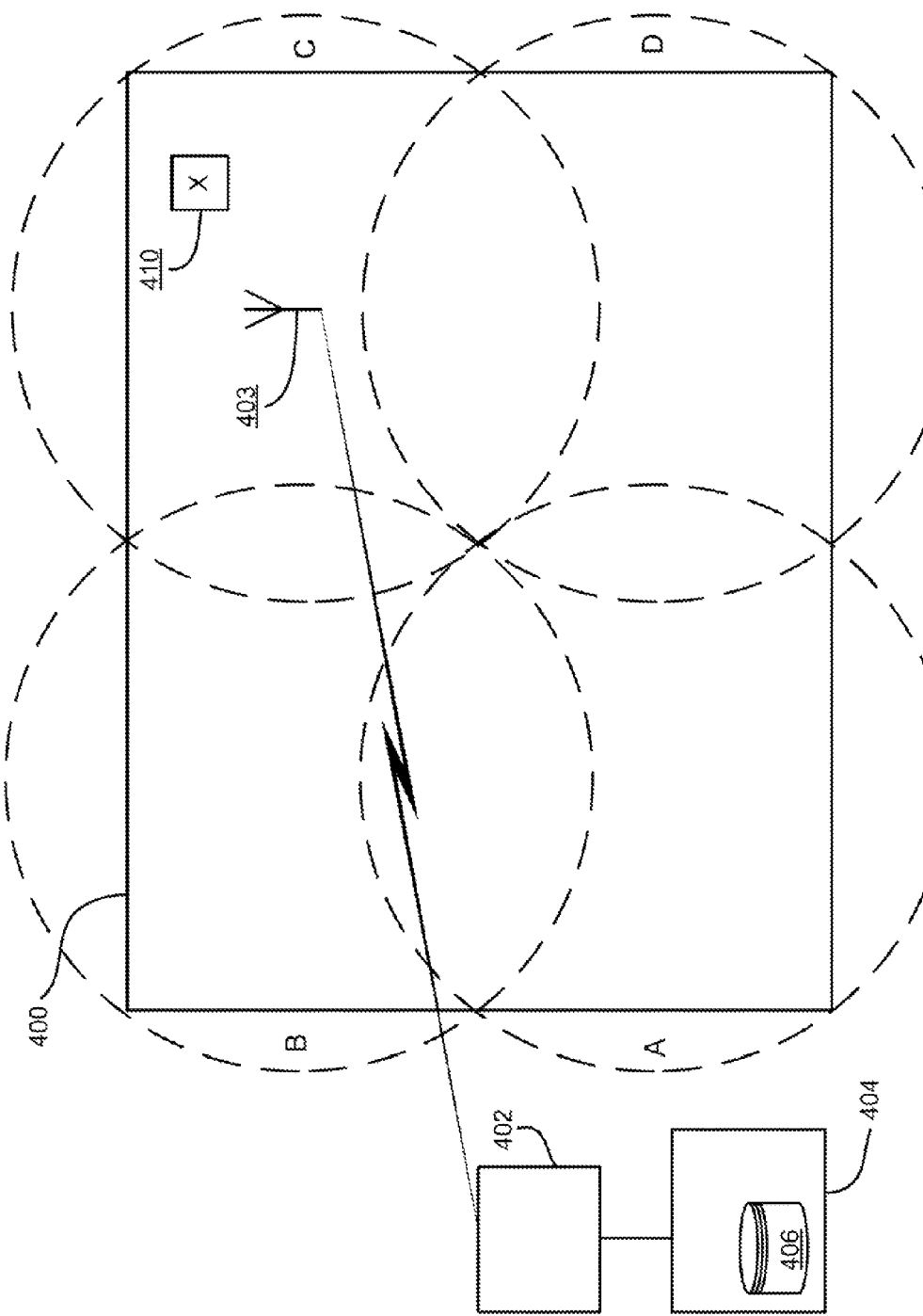
FIG. 4 is a representational drawing of operation of the process of FIG. 3 according to an illustrative embodiment of the present invention.

FIG. 4 illustrates a practical example of the method 300 of FIG. 3. For this example, assume that every concrete block in a yard 400 has an RFID tag coupled thereto or embedded therein. Each tag has a unique ID, which is correlated to information about the block and stored in a database. Such information can include date of manufacture, composition, manufacturer, the date that the block was brought into the yard, etc. Such information can also be stored in memory on the tag in addition to in the database, or in the alternative.

With continued reference to FIG. 4, the search system includes an interrogator 402 in communication with a back-end system 404, which may include the database 406. The interrogator 402 is capable of operating in two modes: active (battery powered tag mode, e.g., C3) and passive (backscatter powered tag mode, e.g., C1G2). The antenna 403 of the interrogator 402 (and potentially the interrogator itself) is attached to a crane that can be lifted high above the yard, thereby potentially communicating with every tag in the yard. During the first transmission, full power is used to identify the tags in range, in this case all tags in the yard 400. Singulation is performed to find the tag of interest (target tag 410) by matching the tag IDs with a target ID in the database 406. If the target tag 410 is found, the transmission power is stepped down to reduce the operating range to say, about ¼ of the size of the yard 400, thereby dividing the yard into quadrants A, B, C and D. Tire antenna 403 is moved by sequentially to each quadrant until the target tag 410 is found. Here, the antenna 403 and the tag of interest 410 are shown in quadrant C. The crane then lowers tire antenna into quadrant C and switches to passive mode (even lower range than quadrant search). Several locations of quadrant C are scanned until the target tag 410 is found. Tire transmission power is again reduced and locations near the place where the target tag was last identified are scanned until the antenna is very near the tag. Then the particular block can be physically identified.

As an added benefit enabled by RFID tagging, several years later, when the blocks are in a building and the tag's onboard battery is dead, an inspector can scan the blocks with an interrogator in passive mode to ID each block and retrieve the properties of each block from tag memory or a database. The systems and methods provided herein can also be used to pinpoint the location of a particular block in the building.

In a variation of the example of FIG. 4, the interrogator (or antenna) can remain active as it moves from quadrants A, B, C and D. In other words, the interrogator continues to scan as it travels along a C-shape path from the center of quadrant A to the center of quadrant D. The interrogator (or antenna) can also remain active as it scans sub-parts of each quadrant.

As alluded above, the effective range of the scan is dependent upon the transmission power of the interrogator. The effective range can be defined as the maximum range from the interrogator antenna that allows any communication between the interrogator and a tag, reliable communication between the interrogator and a tag as defined by a predefined error rate, etc. The effective range can also be defined by a distance where a minimum interrogation signal power level is observed. For example, the approximate interrogator signal strength at 10 meters for a given transmitting power level can be estimated. Assuming the area being scanned has a diameter of about 20 meters, the tags can be instructed to not respond to an interrogation signal below that expected at 10 meters at the given power level. In this way, the effective range of the scan is determined by the interrogator power level, and tags outside the particular zone will not respond. This in turn increases efficiency as only the tags in the zone being observed need be singulated and queried.

Figure 5:
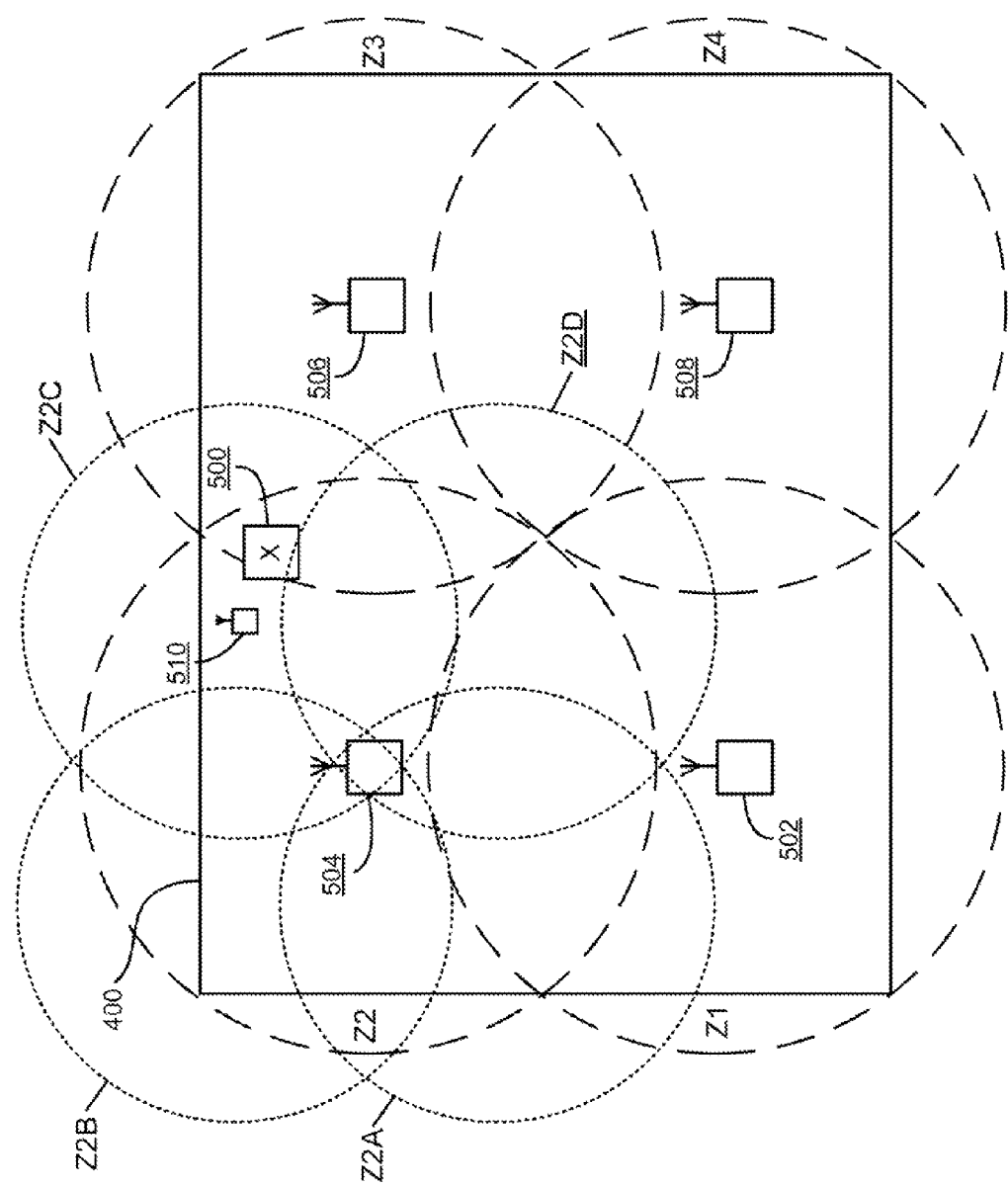
FIG. 5 is a representational drawing of a process according to another embodiment of the present invention.

FIG. 5 illustrates another embodiment of the present invention, where several fixed interrogators 502, 504, 506, 508 (or antennas of a single interrogator) each scan an individual zone Z1, Z2, Z3, Z4 (with some overlap being acceptable) to determine in which zone the target tag 500 is located. Then some or all operations of the process 300 of FIG. 3 can be performed. In one example, once the zone Z2 is identified, an interrogator 510, or its antenna, set to operate in a range smaller than zone Z2 is moved to various sub-zones Z2A, Z2B, Z2C, Z2D of zone Z2 until the target tag 500 is found. Further scanning at lower power in subsections of the sub-zones Z2A, Z2B, Z2C, Z2D is also possible. The scanning operations may be performed entirely in active mode, entirely in passive mode, or a combination of active and passive modes as in the process 300 of FIG. 3.

If a tag falls within two scan areas, as in FIG. 5, subsequent scans can be directed to the area of overlap to increase speed and efficiency.

One skilled in the art will appreciate how the systems and methods presented herein can be applied to a plethora of scenarios and venues, including but not limited to automotive yards, warehouses, construction yards, retail stores, boxcars and trailers, etc. Accordingly, it should be understood that the systems and methods disclosed herein may be used with objects of any type and quantity.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method, comprising:
scanning a zone in an active mode at a first power level for identifying presence of a tag, the tag using at least some battery power to respond to the scanning in the active mode; and
scanning portions of the zone in a passive mode at a second power level for again identifying presence of the tag, the tag not using battery power to respond to the scanning in the passive mode.

2. A method comprising: scanning a zone in an active mode at a first power level for identifying presence of a tag; scanning portions of the zone in a passive mode at a second power level for again identifying presence of the tag; and scanning sub-zones of the zone in an active mode at a third power level, the third power level being lower than the first power level.

3. A method comprising: scanning a zone in an active mode at a first power level for identifying presence of a tag; scanning portions of the zone in a passive mode at a second power level for again identifying presence of the tag; and scanning sub-portions of the zone in a passive mode at a fourth power level, the fourth power level being lower than the second power level.

4. A method as recited in claim 1, wherein multiple zones are individually scanned.

5. A method as recited in claim 4, wherein a single interrogator or antenna thereof is physically moved to each zone.

6. A method as recited in claim 5, wherein a single interrogator performs the scanning in the active mode and the scanning in the passive mode in each of the zones.

7. A method as recited in claim 5, wherein each zone is defined by an effective range of the interrogator at the first power level.

8. A method as recited in claim 4, wherein each zone is scanned by a different interrogator.

9. A method as recited in claim 1, wherein the tag is coupled to an object, the tag storing information about the object, wherein the scanning in the active mode includes activation and singulation of the tag.

10. A method as recited in claim 1, wherein the tag is coupled to an object, the tag having a unique identifier, the identifier being correlated with information about the object in a database, wherein an antenna of an interrogator performing the scanning is physically moved to each portion of the zone, wherein the scanning in at least one of the modes continues as the antenna moves from portion to portion.

11. A Radio Frequency Identification (RFID) system, comprising:
a plurality of RFID tags; and
an RFID interrogator in communication with the RFID tags, the RFID interrogator performing at least a portion of the scanning of method 1.

12. A system, comprising:
an interrogator for scanning a zone in an active mode at a first power level for identifying presence of a tag, wherein the scanning includes activation of the tag from a hibernate state and singulation of the tag;
wherein the interrogator also scans portions of the zone for again identifying presence of the tag.

13. A system comprising: an interrogator for scanning a zone in an active mode at a first power level for identifying presence of a tag, wherein the interrogator also scans portions of the zone for again identifying presence of the tag, the interrogator scanning sub-zones of the zone in an active mode at a third power level, the third power level being lower than the first power level.

14. A system comprising: an interrogator for scanning a zone in an active mode at a first power level for identifying presence of a tag, wherein the interrogator also scans portions of the zone for again identifying presence of the tag, the interrogator scanning sub-portions of the zone in a passive mode at a fourth power level, the fourth power level being lower than the first power level.

15. A system as recited in claim 12, wherein multiple zones are individually scanned.

16. A system as recited in claim 15, wherein a single interrogator or antenna thereof is physically moved to each zone.

17. A system as recited in claim 16, wherein a single interrogator performs the scanning in the active mode and also performs scanning in a passive mode in each of the zones.

18. A system as recited in claim 16, wherein each zone is defined by an effective range of the interrogator at the first power level.

19. A system as recited in claim 15, wherein each zone is scanned by a different interrogator.

20. A method, comprising:
scanning an area at full transmitting power in an active mode for determining presence of a tag, the tag using at least some battery power to respond to the scanning in the active mode, wherein the scanning includes activation of the tag from a hibernate state;
scanning zones of the area in the active mode at a power level less than full transmitting power for identifying the zone in which the tag is located; and
scanning portions of the zone in which the tag is located in a passive mode for identifying the portion of the zone in which the tag is located.

* * * * *